(12) United States Patent
Lin

(10) Patent No.: US 7,290,298 B2
(45) Date of Patent: Nov. 6, 2007

(54) MASSAGE PAD FOR BATH

(75) Inventor: Li-Ying Lin, Taichung Hsien (TW)

(73) Assignee: Mei-Yun Wang, Taipei (TW)

( * ) Notice: Subject to any disclaimer, the term of this patent is extended or adjusted under 35 U.S.C. 154(b) by 356 days.

(21) Appl. No.: 11/007,435

(22) Filed: Dec. 8, 2004

(65) Prior Publication Data

US 2005/0125889 A1    Jun. 16, 2005

(30) Foreign Application Priority Data

Dec. 11, 2003   (TW) .............................. 92221778 U

(51) Int. Cl.
*A47K 3/00* (2006.01)
*A61H 33/06* (2006.01)
(52) U.S. Cl. .............................. 4/559; 4/541.1; 4/541.5
(58) Field of Classification Search ......... 4/559–566.1, 4/567–569, 541.1–541.6; 601/154–160, 601/167–168

See application file for complete search history.

(56) References Cited

U.S. PATENT DOCUMENTS

| | | | | |
|---|---|---|---|---|
| 1,775,942 A | * | 9/1930 | Millmather | 4/541.5 |
| 2,637,541 A | * | 5/1953 | Rubin | 261/122.1 |
| 2,997,285 A | * | 8/1961 | Lefmann | 261/124 |
| 3,031,685 A | * | 5/1962 | Baumann | 261/124 |
| 3,420,227 A | * | 1/1969 | Voorlas | 601/168 |
| 3,809,073 A | * | 5/1974 | Baumann | 601/168 |
| 4,048,266 A | * | 9/1977 | Baumann | 261/122.1 |
| 2001/0044589 A1 | * | 11/2001 | Ferber et al. | 601/168 |

* cited by examiner

*Primary Examiner*—Khoa D. Huynh
*Assistant Examiner*—Kristie A. Mahone
(74) *Attorney, Agent, or Firm*—Alan Kamrath; Kamrath & Associates P.A.

(57) ABSTRACT

A massage pad for a bath includes a cushion having multiple protrusions formed at a top side of the cushion. Multiple suction cups are formed at a bottom side of the cushion. A joint is formed on the cushion. Multiple conduits are communicated with the joint and each has multiple apertures defined through a top surface of the conduit.

8 Claims, 5 Drawing Sheets

MASSAGE PAD FOR BATH

BACKGROUND OF THE INVENTION

1. Field of the Invention

The present invention relates to a massage pad, and more particularly to a pad used in a bathtub for spraying water or air in a bath.

2. Description of Related Art

Relentlessly increasing pressure and tension in modern lives has resulted in a demand for relaxation therapy, especially massage baths. However, the luxurious aspect of such devices for the home tends to cause them to be expensive and beyond affordability for many. Therefore, people who want to enjoy a massage bath, SPA etc., must go to a professional bathhouse providing these services, so they will feel some inconvenience as it is troublesome to have to go out and return home.

Therefore, the invention provides an inexpensive massage pad to mitigate or obviate the aforementioned problems.

SUMMARY OF THE INVENTION

The main objective of the present invention is to provide an inexpensive massage pad which is used in a bathtub to spray water or gas for massage.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
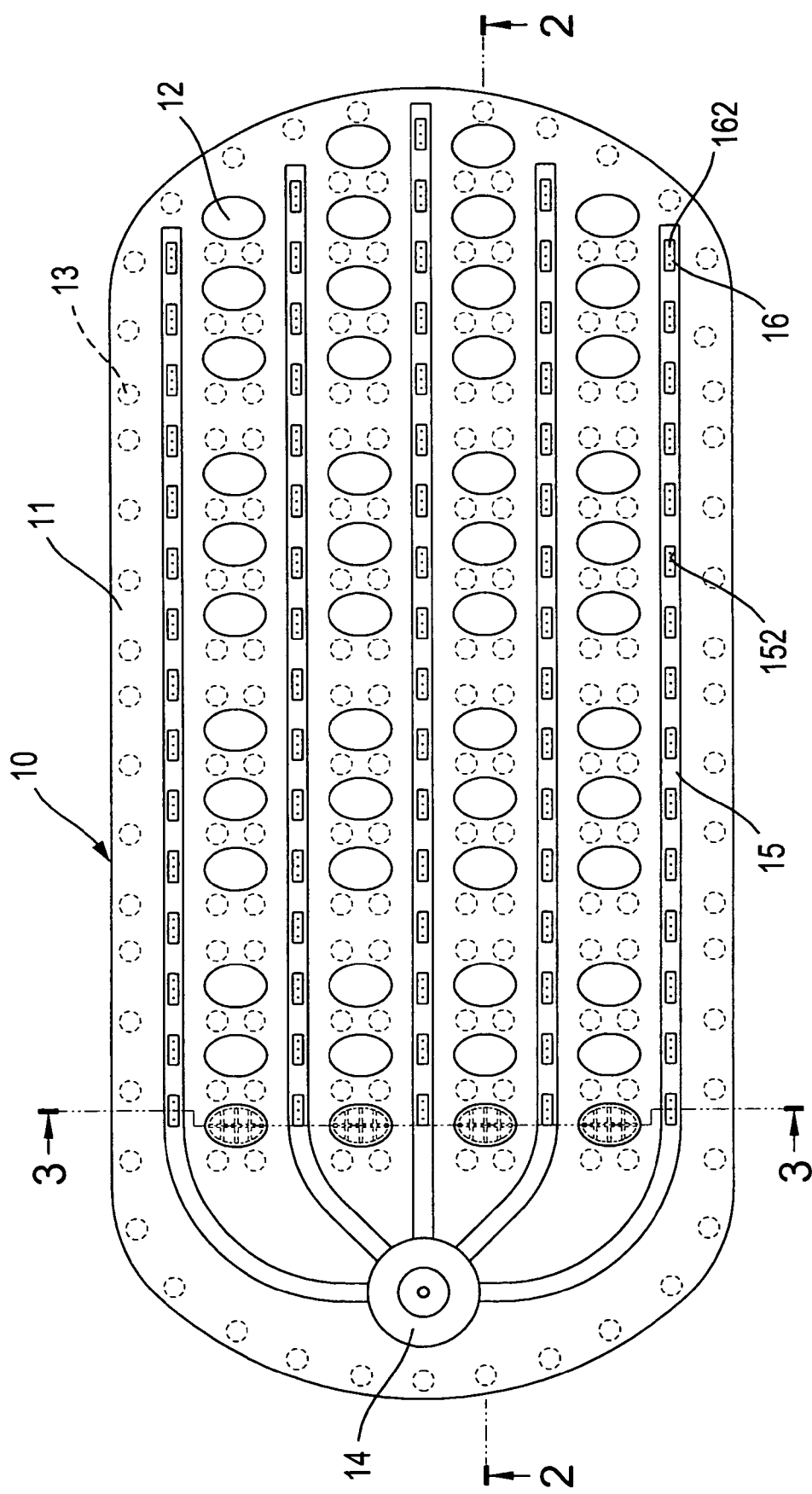
FIG. 1 is a top view of a massage pad in accordance with the present invention.
Figure 2:
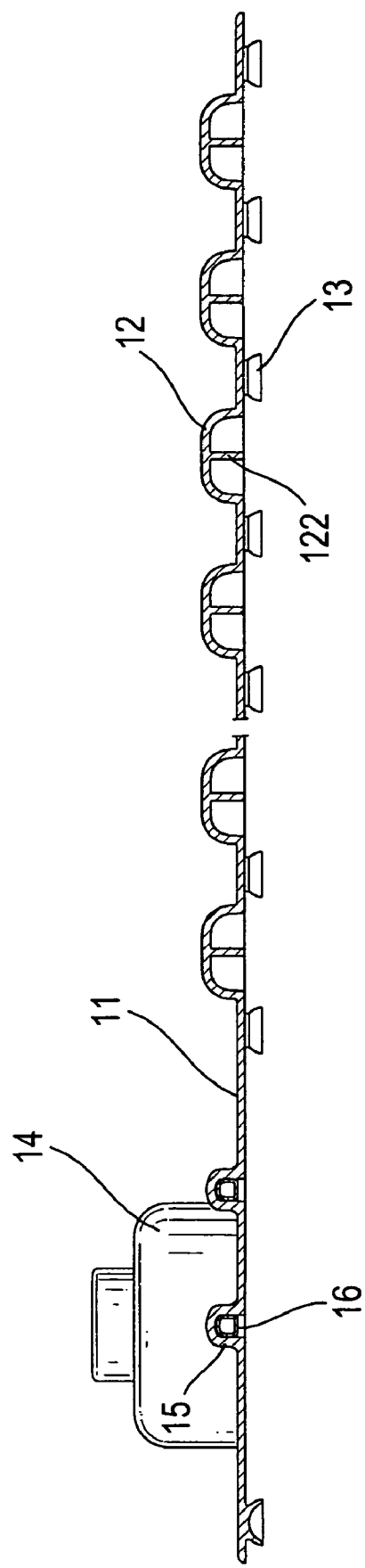
FIG. 2 is a cross sectional front view of the massage pad.
Figure 3:
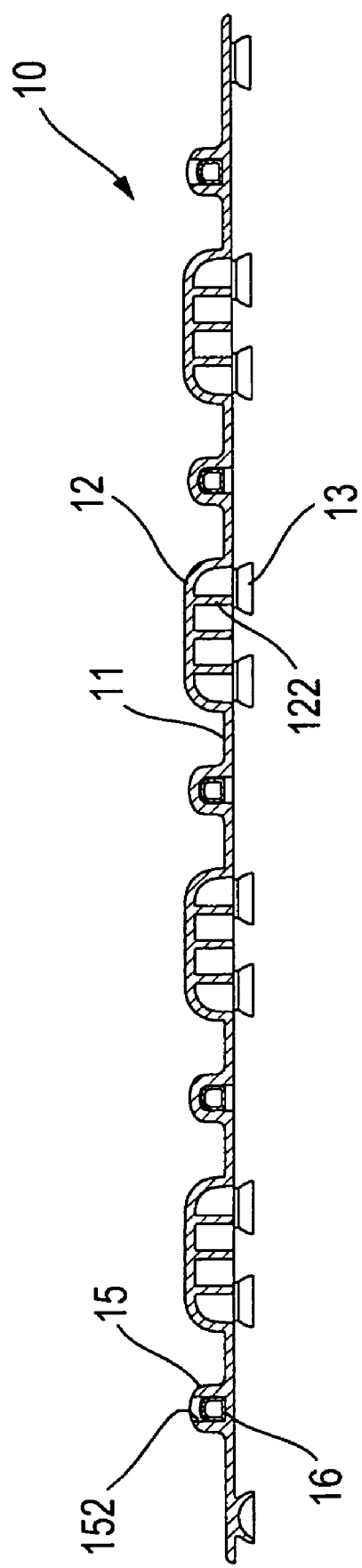
FIG. 3 is a cross sectional side view of the massage pad.

With reference to FIGS. 1-3, a massage pad (10) has a cushion (11) made of a soft material such as plastic or rubber. Multiple hollow protrusions (12) are formed on an upper side of the cushion (11) and each have at least one rib (122) formed therein. Multiple suction cups (13) are formed at a bottom side of the cushion (11) for fastening the cushion (11) in a bathtub.

Figure 4:
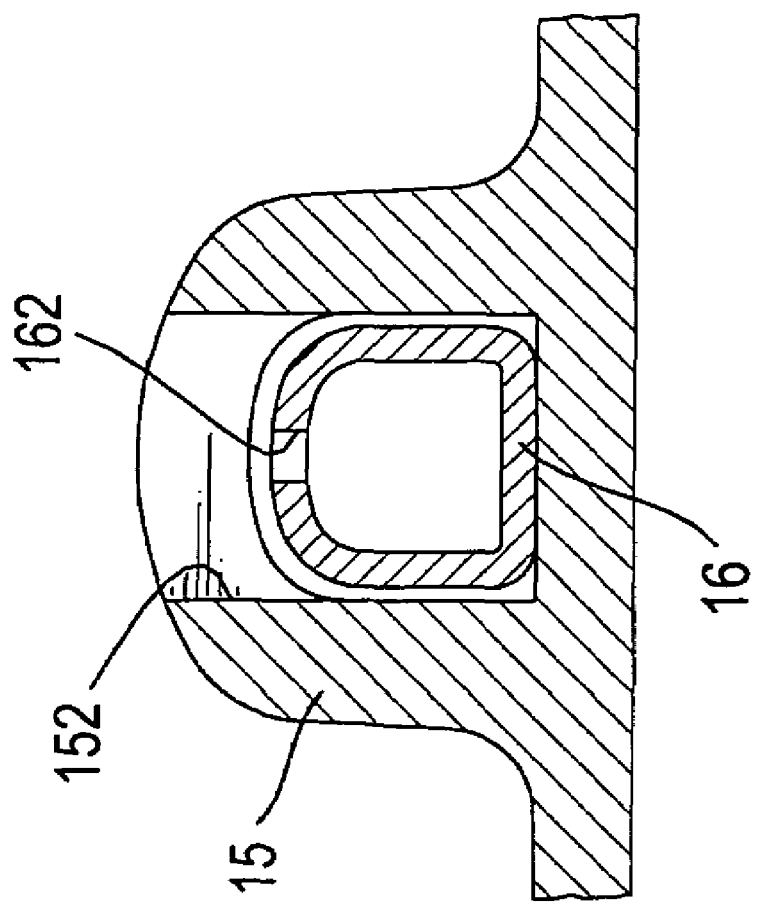
FIG. 4 is an enlarged view of the massage pad.

A joint (14) is provided on the cushion (10) and multiple conduits (16) are communicated with the joint (14). The conduits (16) are respectively covered with multiple ridges (15) protruded from the cushion (10). With reference to FIGS. 1 and 4, the ridges (15) each have multiple openings (152) defined at a top surface thereof, and the conduits (16) each have multiple apertures (162) defined at a top surface thereof and corresponding to the openings (152) of the ridges (15). Therefore, the apertures (162) are exposed from the openings (152).

Figure 5:
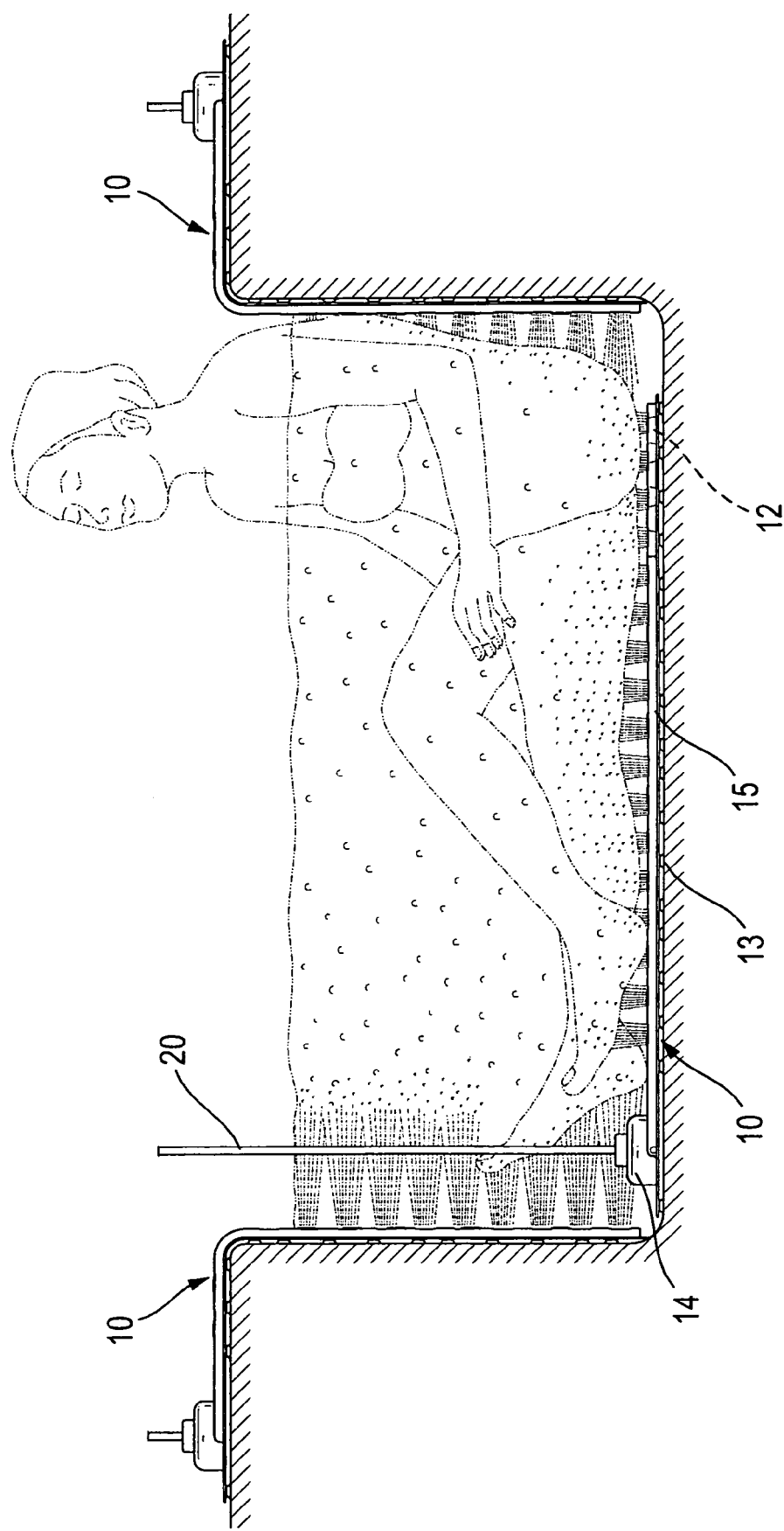
FIG. 5 is a schematic view of a bather in a bathtub with the massage pads.

With reference to FIG. 5, in use, the massage pad (10) can be fastened on the bottom and sidewalls of the bathtub by the suction cups (13). The joint (14) is connected to an air or water spraying device by a pipe (20). The air or water spraying device can be an ozone generator, or an electric pump available on the market. Air or massage liquid is delivered to the joint (14) through the pipe (20) and sprayed from the apertures (162) to massage a bather in the bathtub.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A massage pad for a bath comprising: a cushion having a bottom side and an opposite top side facing in an opposite direction; multiple hollow protrusions formed at the top side of the cushion, with the multiple protrusions upraised above the top side of the cushion, with each of the protrusions forming a concavity, with the concavity being rounded and having an open end, with at least one rib formed in the concavity of the respective protrusions; multiple suction cups formed at the bottom side of the cushion; a joint formed on the cushion; multiple conduits independently communicated with the joint, with each of the multiple conduits having a top surface, with the multiple conduits each having multiple apertures defined through the top surface of the conduit; and multiple ridges protruding from the top side of the cushion, with the multiple ridges each having a top surface, with the top side intermediate the top surfaces of the multiple ridges and the bottom side, with the multiple ridges respectively receiving the conduits, with each of the multiple ridges having multiple openings defined in the top surfaces of the multiple ridges, wherein the multiple apertures of the multiple conduits are respectively exposed from the multiple openings, with the multiple conduits being covered by the top surfaces of the multiple ridges between the multiple openings.

2. The massage pad for a bath as claimed in claim 1, wherein each of the multiple protrusions has an external surface, with the external surfaces of the multiple protrusions being elliptical and the external surfaces of the multiple protrusions having curvature.

3. The massage pad for a bath as claimed in claim 1, wherein one of the multiple ridges is arranged predominantly parallel to the other of the multiple ridges and the multiple ridges are communicated semiradially with the joint in a non-overlapping fashion.

4. The massage pad for a bath as claimed in claim 1, wherein the ribs have a same extent as the bottom side.

5. The massage pad for a bath as claimed in claim 1, wherein the top surfaces of the multiple conduits are intermediate the top side and the top surfaces of the multiple ridges, wherein the multiple apertures are intermediate the top side and the top surfaces of the multiple ridges, and the multiple openings extend between the top surfaces of the multiple conduits and the top surfaces of the multiple ridges.

6. The massage pad for a bath as claimed in claim 1, wherein the multiple protrusions are arranged in a linear array, with the linear array of multiple protrusions on the top side spaced from the multiple ridges on the top side, and wherein the multiple suction cups are arranged in a linear array, with the linear array of multiple suction cups on the bottom side spaced between and parallel to the multiple ridges on the top side.

7. The massage pad for a bath as claimed in claim 1, wherein each of the protrusions has an external surface, with the top surfaces of the multiples ridges and the external surfaces of the multiple protrusions generally at a same level from the bottom side.

8. The massage pad for a bath as claimed in claim 1, wherein the multiple ridges define a length and one of the multiple openings in the top surfaces of the multiple ridges is spaced apart along the length of the multiple ridges from the other of the multiple openings.

* * * * *